United States Patent
Gopisetti et al.

(10) Patent No.: US 10,135,470 B2
(45) Date of Patent: Nov. 20, 2018

(54) SYSTEM AND METHOD TO AUTO-CONFIGURE A TRANSMITTER FOR A SENSOR

(71) Applicant: Honeywell International Inc., Morris Plains, NJ (US)

(72) Inventors: Santosh Gopisetti, Hyderabad (IN); Sharath Babu Malve, Puppalaguda (IN); Chaitanya Kumar Beeram, Hyderabad (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/461,396

(22) Filed: Mar. 16, 2017

(65) Prior Publication Data
US 2018/0269908 A1    Sep. 20, 2018

(51) Int. Cl.
*H04L 27/00* (2006.01)
*H04B 1/02* (2006.01)
*G01R 31/02* (2006.01)

(52) U.S. Cl.
CPC ............. *H04B 1/02* (2013.01); *G01R 31/023* (2013.01)

(58) Field of Classification Search
CPC combination set(s) only.
See application file for complete search history.

(56) References Cited

U.S. PATENT DOCUMENTS

| 5,041,809 A * | 8/1991 | Payne ............... G01K 7/18 219/505 |
| 9,228,905 B2 | 1/2016 | Alley |
| 2010/0109593 A1 * | 5/2010 | Mamba ............ G05B 19/232 318/625 |
| 2010/0262296 A1 * | 10/2010 | Davis ............... G05B 15/02 700/275 |
| 2010/0302008 A1 * | 12/2010 | Engelstad .......... G01D 3/022 340/10.1 |
| 2016/0349311 A1 | 12/2016 | Hayashi et al. |

* cited by examiner

*Primary Examiner* — Wednel Cadeau

(57) ABSTRACT

An apparatus includes a memory element and a processing device. The memory element is configured to store a plurality of configurations for different sensors in an industrial process and control system. The processing device is configured to identify at least one wired connection to a sensor in the industrial process and control system. The processing device is also configured to detect a type of the sensor based on the at least one wired connection. The processing device is also configured to identify a configuration of the plurality of configurations based on the type of the sensor.

11 Claims, 7 Drawing Sheets

SYSTEM AND METHOD TO AUTO-CONFIGURE A TRANSMITTER FOR A SENSOR

TECHNICAL FIELD

This disclosure relates generally to coupling a transmitter to a sensor. More specifically, this disclosure relates to a system and method to auto-configure a transmitter for a sensor.

BACKGROUND

Process plants are often managed using industrial process control and automation systems. Conventional control and automation systems routinely include a variety of networked devices, such as servers, workstations, switches, routers, firewalls, safety systems, proprietary real-time controllers, and industrial field devices. During a commissioning phase of transmitter devices, a user connects a sensor to a transmitter and configures a number of parameters. Generally, configuration is done during initial phases of commissioning a transmitter. A user carries a handheld to configure each transmitter. Commissioning can take a significant amount of time for multiple transmitters in a system.

SUMMARY

A first embodiment of this disclosure provides an apparatus that includes a memory element and at least one processing device. The memory element is configured to store a plurality of configurations for different sensors in an industrial process and control system. The at least one processing device is configured to identify at least one wired connection to a sensor in the industrial process and control system. The at least one processing device is also configured to detect a type of the sensor based on the at least one wired connection. The at least one processing device is also configured to identify a configuration of the plurality of configurations based on the type of the sensor.

A second embodiment of this disclosure provides a method that includes identifying, by a processing device, at least one wired connection to a sensor in an industrial process and control system. The method also includes detecting, by the processing device, a type of the sensor based on the at least one wired connection. The method also includes identifying, by the processing device, a configuration among a plurality of configurations based on the type of the sensor.

A third embodiment of this disclosure provides a non-transitory computer readable medium containing computer readable program code that, when executed, causes at least one processing device to identify at least one wired connection to a sensor in an industrial process and control system. The computer readable program code, when executed, also causes the at least one processing device to detect a type of the sensor based on the at least one wired connection. The computer readable program code, when executed, also causes the at least one processing device to identify a configuration among the plurality of configurations based on the type of the sensor.

Other technical features may be readily apparent to one skilled in the art from the following figures, descriptions, and claims. Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases may be provided throughout this patent document, and those of ordinary skill in the art should understand that in many, if not most instances, such definitions apply to prior, as well as future uses of such defined words and phrases.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 8, discussed below, and the various embodiments used to describe the principles of the present invention in this patent document are by way of illustration only and should not be construed in any way to limit the scope of the invention. Those skilled, in the art will understand that the principles of the invention may be implemented in any type of suitably arranged device or system.

Figure 1:
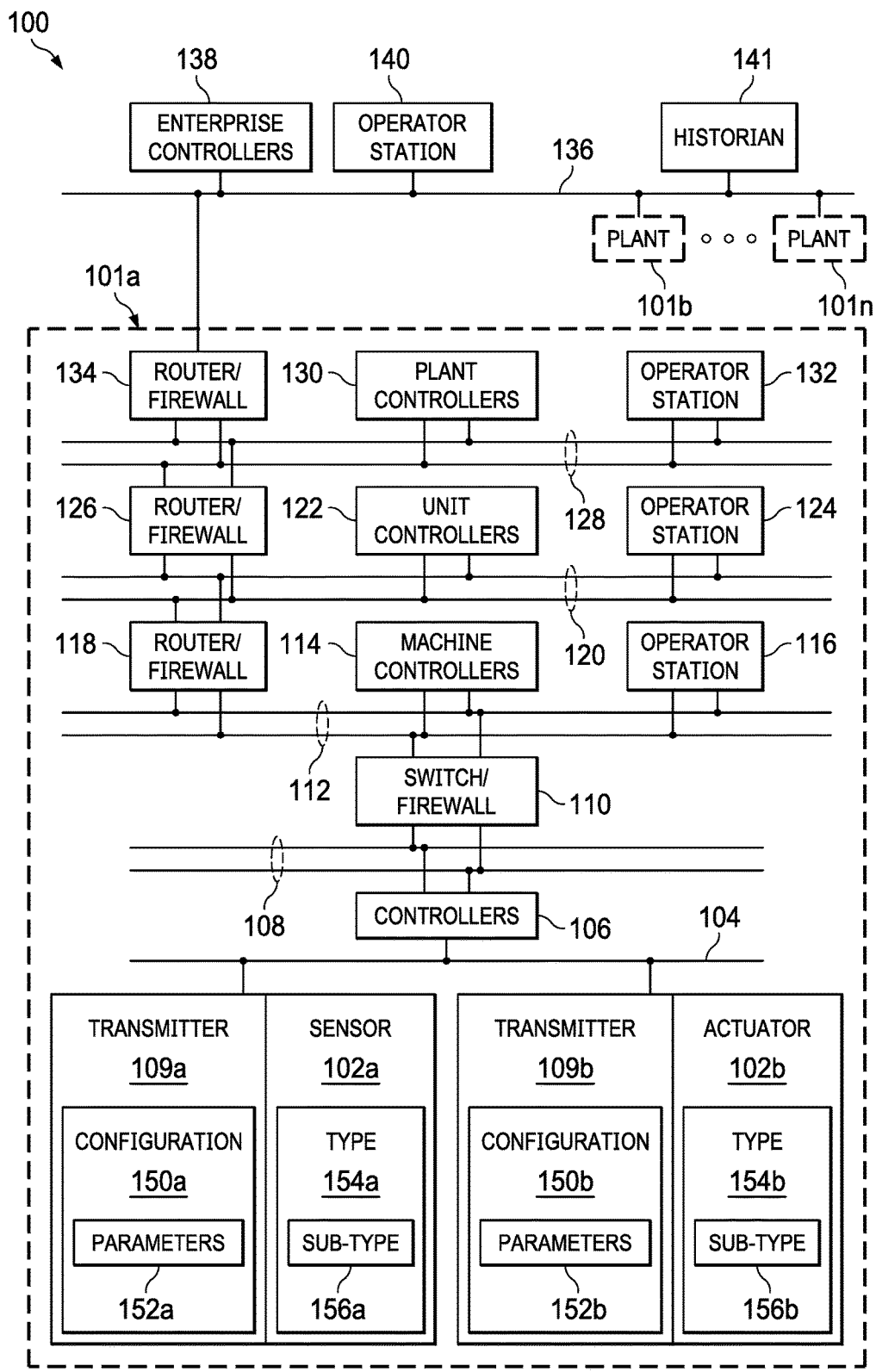
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system.

Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Multiple controllers 106 could also operate in redundant configurations, such as when one controller 106 operates as a primary controller while another controller 106 operates as a backup controller (which synchronizes with the primary controller and can take over for the primary controller in the event of a fault with the primary controller). Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Additionally or alternatively, each controller 122 could represent a multivariable controller, such as a HONEYWELL C300 controller. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers and operator stations could include one or more processing devices and one or more memories for storing instructions and data used, generated, or collected by the processing device(s). Each of the controllers and operator stations could also include at least one network interface, such as one or more Ethernet interfaces or wireless transceivers.

In one or more embodiments of this disclosure, one or more sensors 102a and actuators 102b are coupled to transmitters 109a-109b, respectively. Transmitters 109a-109b can be near field or short-range wireless transmitters designed for use with sensors 102a and actuators 102b in the process industry to transmit device data including certain critical process variables like pressure, temperature, level, flow, energy, and the like. The process variables can be obtained from sensors 102a or provided to actuators 102b on a pipeline, tank, etc. The transmitters 109a-109b can be loop-powered devices powered by a 4-20 ma current loop. The transmitters 109a-109b could include a transceiver and are configured to send and receive wireless signals.

As described in more detail below, various components in the system 100 could be designed or modified to operate in conjunction with a transmitter to detect a type of sensor. For example, a transmitter 109a coupled to one or more of the sensors 102a could be configured to measure a voltage drop to determine the type of connected sensor 102a.

One or more embodiments of this disclosure recognize and take into account that during a commissioning phase of a transmitter 109a-109b (e.g., temperature transmitter), a user connects the sensor 102a (e.g., resistance temperature detector (RTD)/thermocouple) or actuator 102b to the transmitter 109a-109b and sets a configuration 150a-150b to configure critical parameters 152a-152b such as a type 154a-154b of the device, a sub-type 156a-156b of the device (e.g., RTD), a type of connection (e.g., when RTD, 2, 3, or 4 wire), lower range value (LRV), upper range value (URV), and a process variable unit.

In some embodiments, different parameters 152a-152b can be optional or mandatory. In one embodiment, all parameters 152a-152b are mandatory for a user to set in a temperature transmitter. The configurations 150a-150b of the parameters 152a-152b can be set during initial phases of commissioning a transmitter 109a-109b. In some systems, the user carries a handheld to perform the above steps and takes a considerable amount of time to configure the same. For some projects, the user has to perform the configuration activity for multiple transmitters, which takes a large amount of time and adds to the cost of the project.

To address these and other issues, embodiments of this disclosure provide one or more transmitters 109a-109b where each transmitter 109a-109b self-detects the type of sensor 102a or actuator 102b connected and self-configures its critical parameters 152a-152b, which in turn reduces the device configuration time. This solution is useful for plant personnel to reduce the project commissioning life cycle for a transmitter 109a-109b.

Although FIG. 1 illustrates one example of an industrial process control and automation system 100, various changes may be made to FIG. 1. For example, the system 100 could include any number of sensors, actuators, controllers, servers, operator stations, networks, and other components. Also, the makeup and arrangement of the system 100 in FIG. 1 is for illustration only. Components could be added, omitted, combined, or placed in any other suitable configuration according to particular needs.

Further, particular functions have been described as being performed by particular components of the system 100. This is for illustration only. In general, control and automation systems are highly configurable and can be configured in any suitable manner according to particular needs. In addition, FIG. 1 illustrates one example operational environment where a transmitter can be automatically configured. This functionality can be used in any other suitable system, and the system need not be related to industrial process control and automation.

Figure 2:
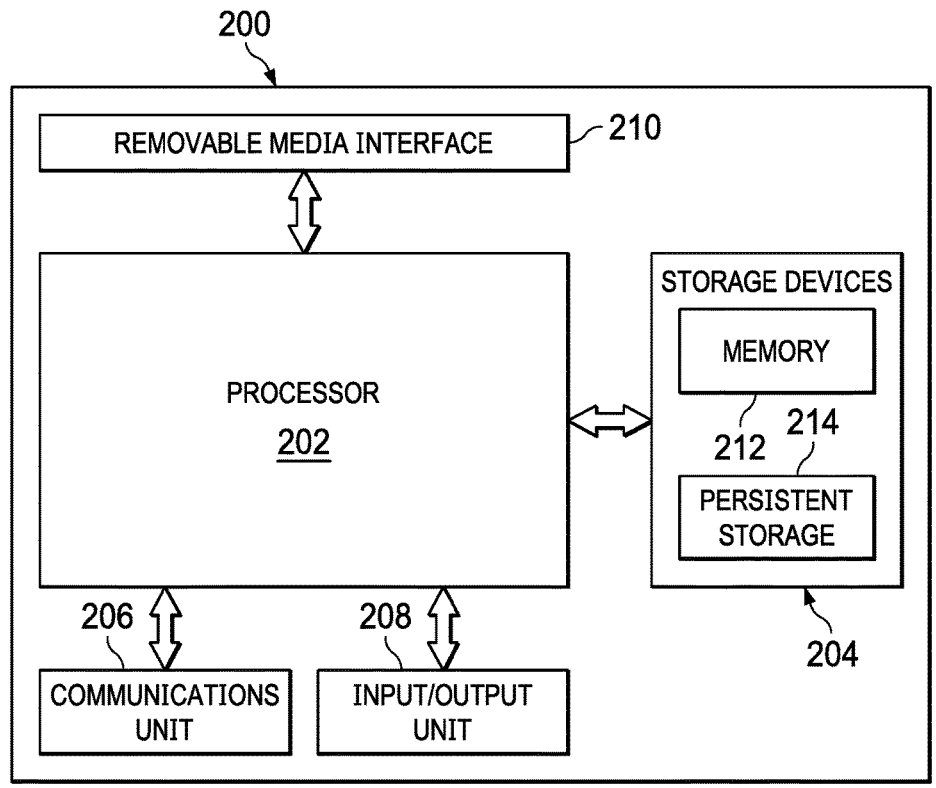
FIG. 2 illustrates an example device supporting automatic configuration of a transmitter according to this disclosure.

FIG. 2 illustrates an example device 200 supporting automatic configuration of a transmitter according to this disclosure. In different embodiments, the device 200 could, for example, represent one of the operator stations 116, 124, 132, 140 of FIG. 1. However, the operator stations 116, 124, 132, 140 could be implemented using any other suitable device or system, and the device 200 could be used in any other suitable system.

As shown in FIG. 2, the device 200 includes at least one processor 202, at least one storage device 204, at least one communications unit 206, at least one input/output (I/O) unit 208, and at least one removable media interface 210. Each processor 202 can execute instructions, such as those that may be loaded into a memory 212. Each processor 202 denotes any suitable processing device, such as one or more microprocessors, microcontrollers, digital signal processors, application specific integrated circuits (ASICs), field programmable gate arrays (FPGAs), or discrete circuitry.

The memory 212 and a persistent storage 214 are examples of storage devices 204, which represent any structure(s) capable of storing and facilitating retrieval of information (such as data, program code, and/or other suitable information on a temporary or permanent basis). The memory 212 may represent a random access memory or any other suitable volatile or non-volatile storage device(s). The persistent storage 214 may contain one or more components or devices supporting longer-term storage of data, such as a read only memory, hard drive, Flash memory, or optical disc. In accordance with this disclosure, the memory 212 and persistent storage 214 may be configured to store information and data associated with automatic configuration of a transmitter.

The communications unit 206 supports communications with other systems or devices. For example, the communications unit 206 could include a network interface card or a wireless transceiver facilitating communications over a wired or wireless network (such as any of the networks 104, 108, 112, 120, 128, 136). The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

Each removable media interface 210 denotes a structure to which a storage device can be coupled. For example, the device 200 could include one or more USB slots, Secure Digital High Capacity (SDHC) or other Flash memory slots, or other interfaces for coupling to storage devices. Depending on the implementation, the device 200 could include a single removable media interface 210, multiple removable media interfaces 210 of the same type or of different types, or no interfaces 210.

Although FIG. 2 illustrates one example of a device 200 supporting automatic configuration of a transmitter, various changes may be made to FIG. 2. For example, various components in FIG. 2 could be combined, further subdivided, or omitted and additional components could be added according to particular needs. Also, computing devices can come in a wide variety of configurations, and FIG. 2 does not limit this disclosure to any particular configuration of computing device.

One or more embodiments provides a process to detect a sensor type connected to transmitter terminals. For example, when the detected sensor is an RTD, the transmitter can determine a sub-type, such as, but not limited to Pt25, Pt50, Pt100, Pt1000, Cu10, Ni500, etc. The transmitter can also determine whether the sensor, such as an RTD, is 2 wire, 3 wire, or 4 wire. The transmitter can use a switch to connect the reference resistor to the terminals during a 2/3/4 wire detection. The transmitter can configure LRV, URV and unit based on a type and sub-type of the sensor.

One or more embodiments of this disclosure provide a method to detect a sensor sub-type connected to the transmitter terminals. For example, when the sensor is an RTD, the sub-type can be, but not limited to, Pt25, Pt50, Pt100, Pt1000, Cu10, Ni500, etc. From the measured voltage (V) across the terminal (1-2 for 2 W, 1-2 for 3 W, 2-3 for 4 W), the transmitter can infer the resistance across the terminals as R=V/I. Based on the resistance inferred and CJ, the sub-type can be identified.

An embodiment of this disclosure provides a sequence of operations. First, an operator installs the device and connects the sensor to the transmitter in accordance with a defined wiring diagram. Second, the device is powered up. Third, the device enters into self-configuration mode. Fourth, the device will self-configure a sensor type, sensor sub-type, LRV, URV values, units automatically. Fifth, a HART diagnostic is set indicating self-device configuration is completed.

Figure 3:
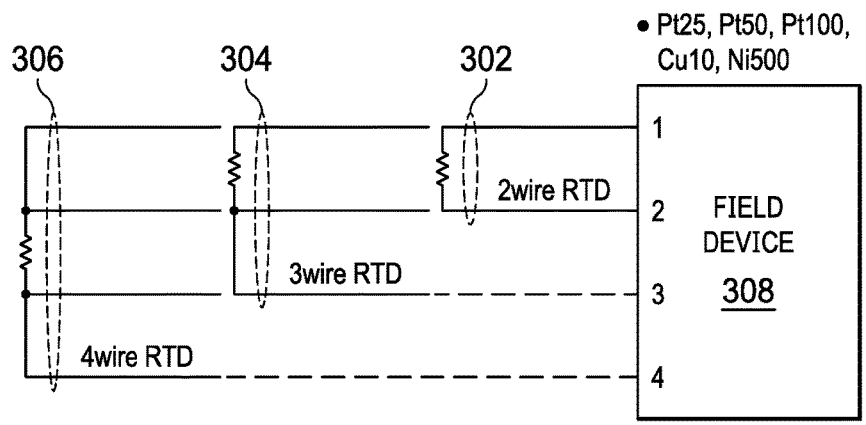
FIG. 3 illustrates a wiring of sensors to a transmitter according to this disclosure.

FIG. 3 illustrates a wiring of sensors 302-306 to a transmitter 308 according to this disclosure. The embodiments of the sensors 302-306 shown in FIG. 3 are for illustration only. Other embodiments could be used without departing from the scope of the present disclosure.

FIG. 3 provides example wiring diagrams for a 2 wire sensor 302, a 3 wire sensor 304, and a 4 wire sensor 306. The transmitter 308 can also be referred to as a field device. In this example, the transmitter 308 comprises four terminals used to connect to a sensor. The transmitter 308 could include additional terminals used for other purposes. In different example embodiments, the transmitter 308 could comprise more or less than four terminals used to connect to a sensor.

In this embodiment, the sensors 302-306 are RTD sensors. Each of the sensors could be a sub-type of RTD sensor, such as, but not limited to, Pt25, Pt50, Pt100, Pt1000, Cu10, Ni500, etc.

Although FIG. 3 illustrates examples sensors and a transmitter, various changes may be made to FIG. 3. For example, various components in FIG. 3 could be combined, further subdivided, or omitted and additional components could be added according to particular needs. Also, sensors and transmitters can come in a wide variety of configurations, and FIG. 3 does not limit this disclosure to any particular configuration of a sensor or transmitter.

Figure 4:
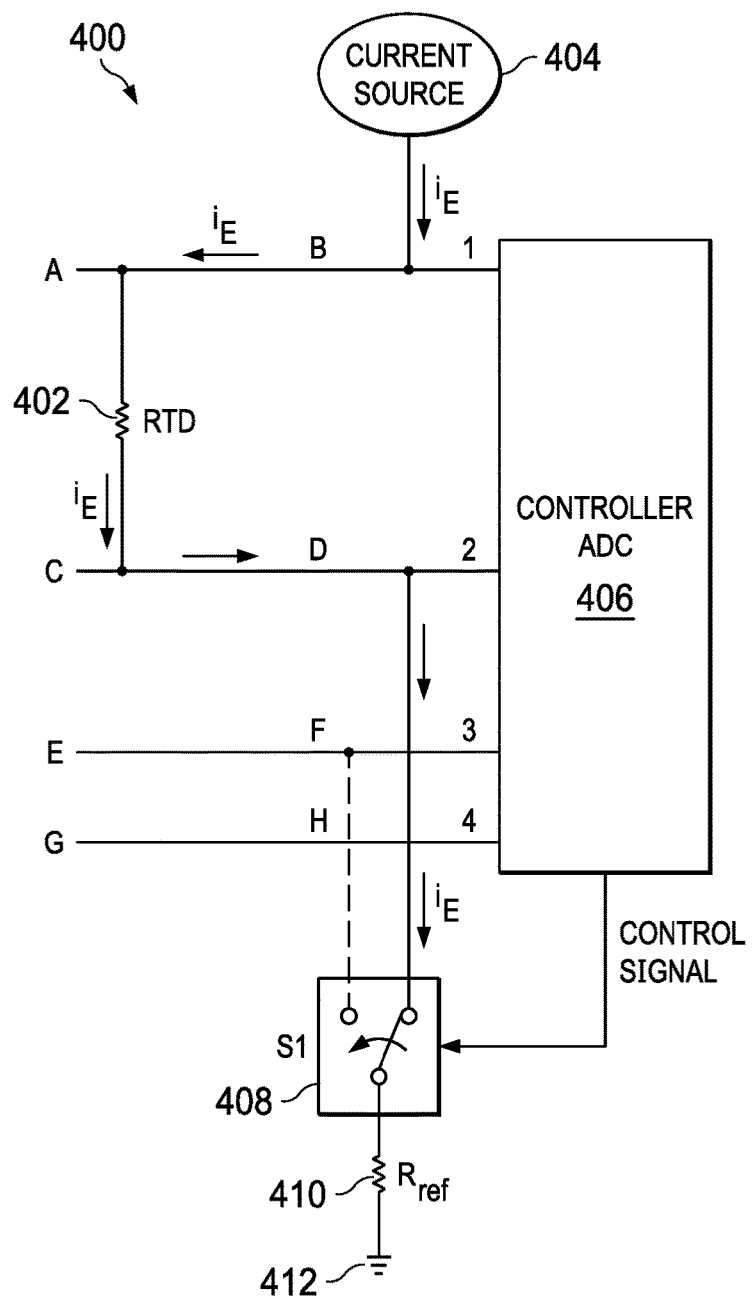
FIG. 4 illustrates a 2 wire sensor connection diagram according to this disclosure.

FIG. 4 illustrates a 2 wire sensor connection diagram 400 according to this disclosure. The embodiments of the sensor connection diagram shown in FIG. 4 are for illustration only. Other embodiments could be used without departing from the scope of the present disclosure.

The diagram 400 includes an RTD 402 and a transmitter. Components of the transmitter are shown as current source 404, controller 406 with an analog-to-digital converter (ADC), switch 408, resistor 410, and ground 412.

The diagram 400 shows an excitation current $i_E$ provided by the current source 404. In this example, the RTD 402 is connected to leads 2 and 3 of the controller 406. The controller 406 can set switch 408 to lead 2 and measure the voltage drop across these terminals. If an open circuit is detected then the RTD 402 is a 2 wire RTD as shown in diagram 400.

The excitation current $i_E$, for a 2 wire RTD, moves through path B-A-C-D, to switch 408, and then to the resistor 410. The controller 406 can measure the voltage drop between A and C (VAC) that is across the RTD 402. If a valid value is measured across VDF then the sensor is a 3 or 4 wire RTD. A valid value can be any non-zero value. If there is a valid value, then the controller 406 can connect the switch 408 to lead 3 to determine if the RTD 402 is a 3-wire or 4-wire.

Although FIG. 4 illustrates an example of a 2 wire RTD sensor, various changes may be made to FIG. 4. For example, various components in FIG. 4 could be combined, further subdivided, or omitted and additional components could be added according to particular needs. Also, sensors can come in a wide variety of configurations, and FIG. 4 does not limit this disclosure to any particular configuration of sensor.

Figure 5:
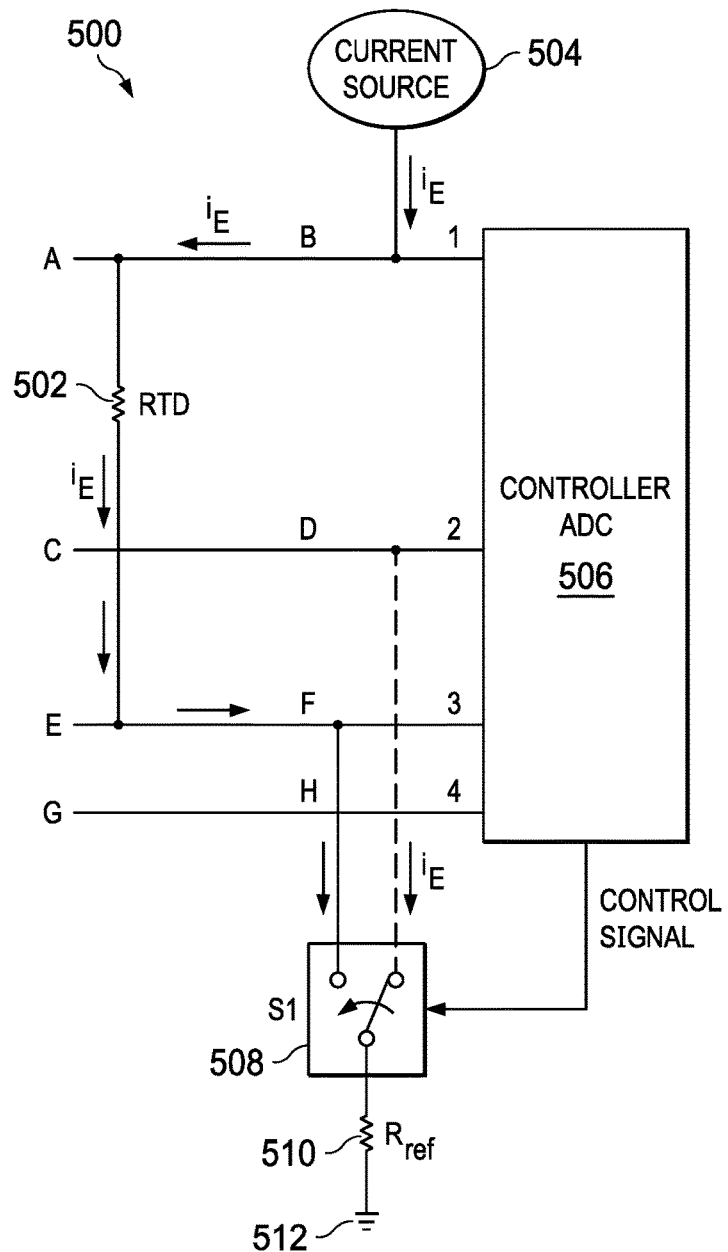
FIG. 5 illustrates a 3 wire sensor connection diagram according to this disclosure.

FIG. 5 illustrates a 3 wire sensor connection diagram 500 according to this disclosure. The embodiments of the sensor connection diagram shown in FIG. 5 are for illustration only. Other embodiments could be used without departing from the scope of the present disclosure.

The diagram 500 includes an RTD 502 and a transmitter. Components of the transmitter are shown as current source 504, controller 506 with an analog-to-digital converter (ADC), switch 508, resistor 510, and ground 512.

The diagram 500 shows an excitation current $i_E$ provided by current source 504. In this example, the RTD 502 is connected to leads 1, 2, and 3 of the controller 506. The controller 506 can set switch 508 to lead 3 and measure the voltage drop across leads 1 and 3 (VBF). If an open circuit is detected then the RTD 502 is a 3 wire RTD as shown in diagram 500. The excitation current $i_E$, for a 3 wire RTD, moves through path B-A-C-E-F, to switch 508, and then to the resistor 510.

The transmitter can also measure the voltage drop between leads 3 and 2 (VDF). Once VBF and VDF are known, the controller 506 can determine VRTD=VBF−VDF. If a valid value is measured across leads 3 and 4 then the sensor would be a 4-wire RTD.

Although FIG. 5 illustrates an example of a 3 wire RTD sensor, various changes may be made to FIG. 5. For example, various components in FIG. 5 could be combined, further subdivided, or omitted and additional components could be added according to particular needs. Also, sensors can come in a wide variety of configurations, and FIG. 5 does not limit this disclosure to any particular configuration of sensor.

Figure 6:
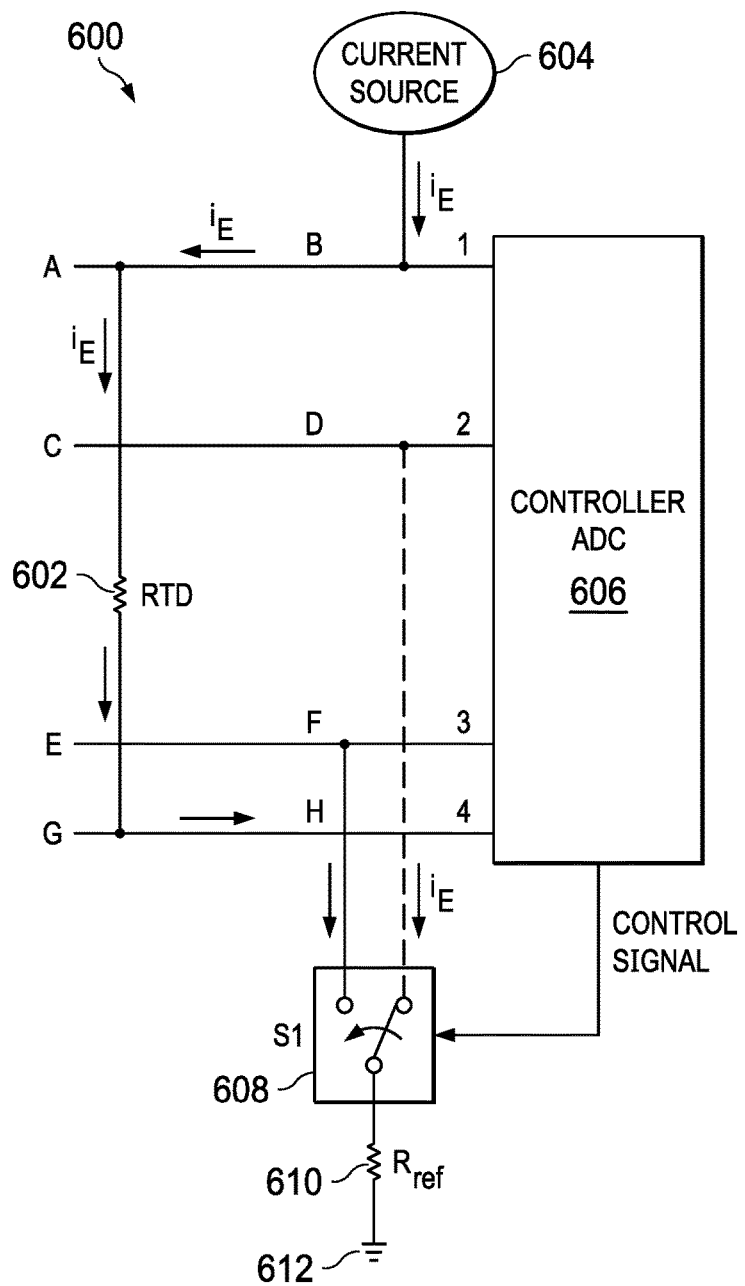
FIG. 6 illustrates a 4 wire sensor connection diagram according to this disclosure.

FIG. 6 illustrates a 4 wire sensor connection diagram 600 according to this disclosure. The embodiments of the sensor connection diagram shown in FIG. 6 are for illustration only. Other embodiments could be used without departing from the scope of the present disclosure.

The diagram 600 includes an RTD 602 and a transmitter. Components of the transmitter are shown as current source 604, controller 606 with an analog-to-digital converter (ADC), switch 608, resistor 610, and ground 612.

The diagram 600 shows an excitation current $i_E$ provided by current source 604. In this example, the RTD 602 is connected to leads 1, 2, 3, and 4 of the controller 606. The controller 506 can set switch 608 to lead 3 and measure the voltage drop across leads 1 and 3 (VBF). The excitation current $i_E$, for a 3 wire RTD, moves through path B-A-C-E-F, to switch 608, and then to the resistor 610. When leads 2 and 4 are connected to the sensor, an excitation current $i_E$ moves through path BACEF, to switch 608, and then to the resistor 610. For a 4 wire RTD, VBF is VRTD.

Although FIG. 6 illustrates an example of a 4 wire RTD sensor, various changes may be made to FIG. 6. For example, various components in FIG. 6 could be combined, further subdivided, or omitted and additional components could be added according to particular needs. Also, sensors can come in a wide variety of configurations, and FIG. 6 does not limit this disclosure to any particular configuration of sensor.

Figure 7:
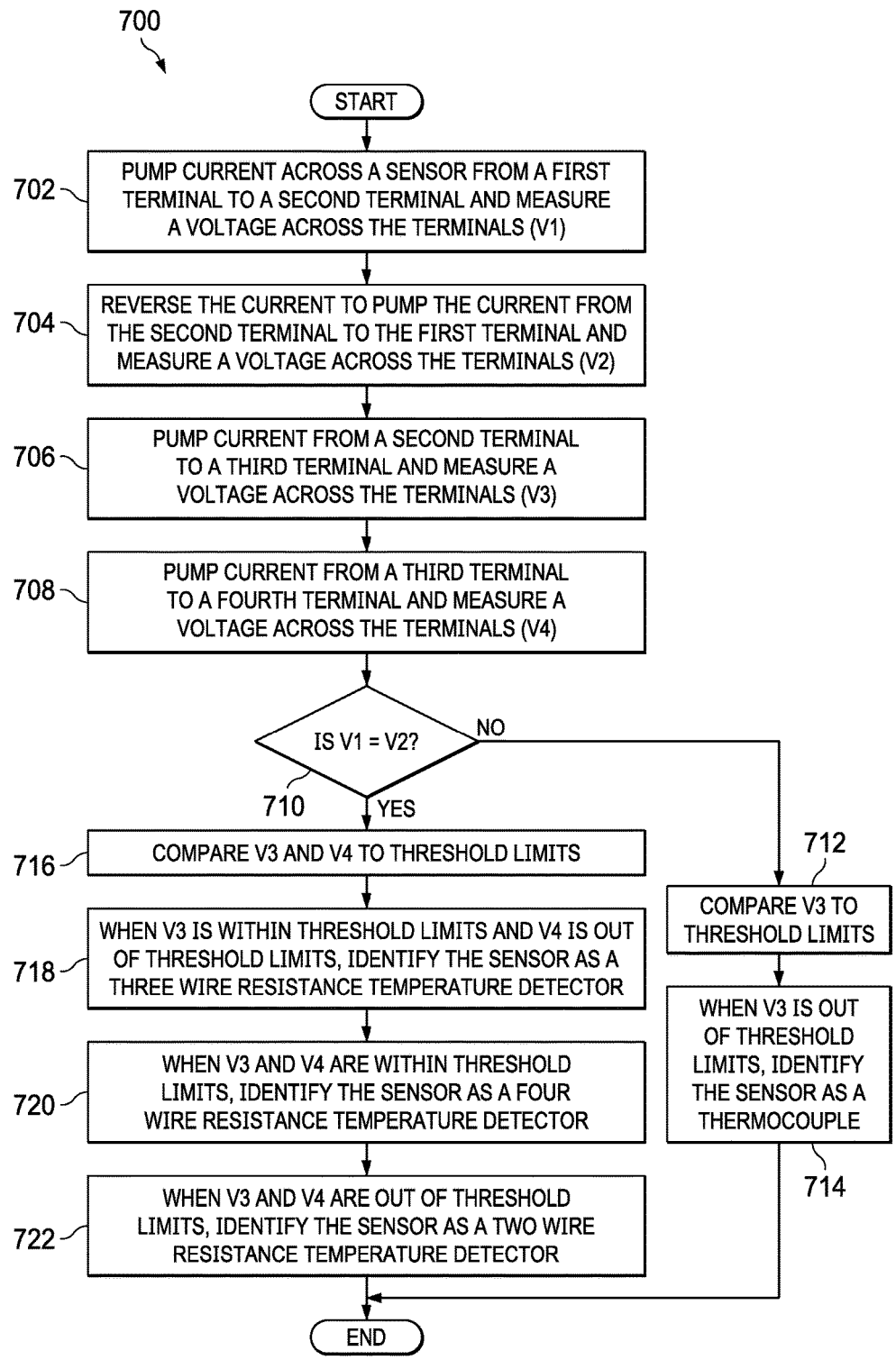
FIG. 7 illustrates an example process for detecting a sensor type connected to transmitter terminals according to this disclosure.

FIG. 7 illustrates an example process 700 for detecting a sensor type connected to transmitter terminals according to this disclosure. A processing device, such as a controller, processor, or processing circuitry, can implement different operations in FIG. 7. The process 700 can be implemented in a transmitter 109a-109b of FIG. 1.

At 702, the transmitter can pump A current (I) across the sensor connected, from the first terminal to the second terminal, and measure the voltage (V1) across the terminals. At 704, the transmitter can reverse the current I to pump the current from second terminal to the first terminal, and measure the voltage (V2) across the same terminals. At 706, the transmitter can pump an current I across the sensor connected, from the second terminal to the third terminal, and measure the voltage (V3) across the terminals. At 708, the transmitter can pump the current I across the sensor connected, from the third terminal to the fourth terminal, and measure the voltage (V4) across the same terminals. These voltages V1-V4 are used to identify the type of sensor.

For example, at 710, V1 is compared to V2 to determine if V1 is equal to V2. If not, then at 712, the transmitter compares V3 to threshold limits. At step 714, if V3 is within the threshold limits, the transmitter can identify the sensor as a thermocouple.

If V1 and V2 are substantially equal, the sensor can be an RTD sensor. If the sensor is an RTD, the transmitter can check for whether the sensor is a 2 wire (W) RTD, 3 W RTD, or 4 W RTD. At 716, the transmitter compares V3 and V4 to threshold limits.

When V3 is within the threshold limits and V4 is out of the threshold limits, at 718, the transmitter can identify the sensor is a 3 wire RTD, else the transmitter can identify the sensor as a 2 W or 4 W RTD. When V3 and V4 are within the threshold limits, at 720, the transmitter can identify the sensor as a 4 W RTD. When V3 and V4 are within the threshold limits, at 722, the transmitter can identify the sensor as a 2 W RTD.

Although FIG. 7 illustrates one example of a process 700 for detecting a sensor type connected to transmitter terminals in an industrial process control and automation system, various changes may be made to FIG. 7. For example, while FIG. 7 shows a series of steps, various steps could overlap, occur in parallel, occur in a different order, or occur any number of times.

Figure 8:
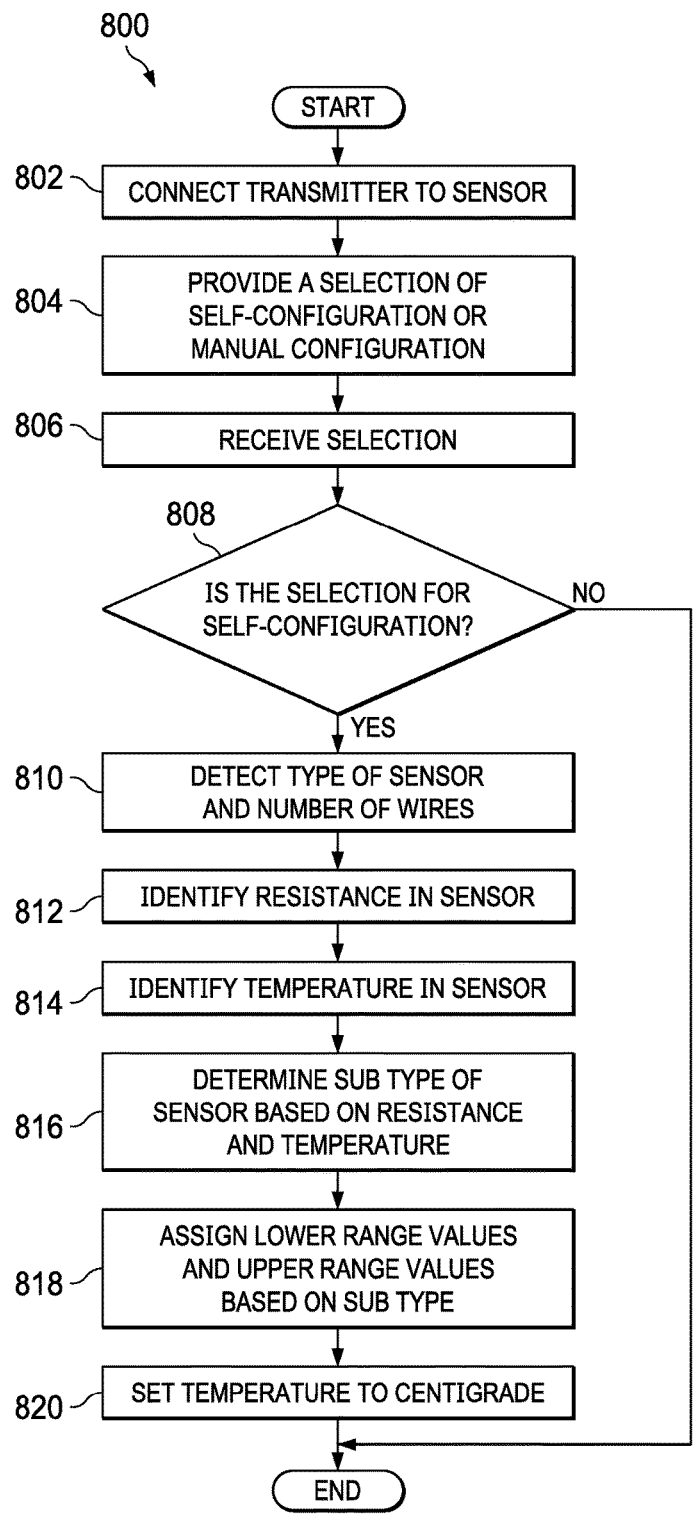
FIG. 8 illustrates an example process for transmitter configuration according to this disclosure.

FIG. 8 illustrates an example process 800 for transmitter configuration according to this disclosure. A processing device, such as a controller, processor, or processing circuitry, can implement different operations in FIG. 8. The process 800 can be implemented in a transmitter 109a-109b shown in FIG. 1.

At 802, the transmitter is connected to the sensor. The transmitter and sensor can be powered on. If the sensor is an RTD, the sensor can start to report an ambient temperature to the transmitter. In one example, the sensor is already powered on when the transmitter is connected. Additionally, the transmitter can identify the presence of a sensor when the transmitter is powered on.

At 804, the transmitter can provide a selection of self-configuration or manual configuration. At 806, the transmitter can receive a selection, and at 808, the transmitter can determine whether the selection is for self-configuration or manual configuration. If manual, the process can terminate and the configuration can be entered manually by a user or operator.

If the selection is for self-configuration, at 810, the transmitter can detect a type of sensor and number of wires. The process used in operation 810 can be, for example, process 700 of FIG. 7.

Once the type of sensor is known, for example when the sensor is an RTD, the transmitter can identify a sub-type of RTD. At 812, the transmitter can identify a resistance in the sensor. In this example, the transmitter can send a known current value. At 814, the transmitter can identify a temperature in the sensor. The transmitter can cross check a cold-junctions (CJ) value (ambient temperature value). At 816, the transmitter can determine a sub-type of sensor based on the resistance and temperature. In this example, the transmitter can dross check the known ambient temperature (from CJ) observed across the terminals with different temperature tables to identify an exact or nearest value of a sub-type sensor.

At 818, when the sub-type is known, the transmitter can assign LRV and URV values based on the sub-type. For example, if the sub-type sensor is identified as Pt 100, then LRV and URV values are configured to −200 to 850 degrees Centigrade. At 820, once ranges are assigned, a temperature unit in the transmitter is configured as degrees Centigrade as default.

Although FIG. 8 illustrates one example of a process 800 for transmitter configuration in an industrial process control and automation system, various changes may be made to FIG. 8. For example, while FIG. 8 shows a series of steps, various steps could overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B, and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
 a memory element configured to store a plurality of configurations for different sensors;
 at least one processing device configured to:
 identify at least one wired connection to a sensor;
 detect a type of the sensor based on the at least one wired connection; and
 the step of detecting comprising:
 identifying a number of the at least one wired connection, the type of the sensor is based on the number of the at least one wired connection wherein the step of identification comprises providing an excitation current via a transmitter, to the sensor and measuring a voltage across the sensor: and
 identify a configuration of the plurality of configurations based on the type of the sensor;
 wherein the configuration includes an upper range value and a lower range value for an operating temperature of the sensor.

2. The apparatus of claim 1, wherein the configuration includes a sub-type for the type of the sensor, wherein the at least one processing device is further configured to:
 identify one or more of a resistance or temperature of the sensor; and
 determine a sub-type for the type of sensor based on at least one of the resistance or temperature of the sensor.

3. The apparatus of claim 1, wherein the at least one processing device is further configured to provide an option for a selection of self-configuration or manual configuration, the apparatus further comprising:
 an input configured to receive the selection for either self-configuration or manual configuration.

4. The apparatus of claim 1, further comprising: a switch configured to direct the excitation current.

5. A method comprising:
 identifying, by a processing device, at least one wired connection to a sensor;
 detecting, by the processing device, a type of the sensor based on the at least one wired connection; and
 the step of detecting comprising identifying a number of the at least one wired connection, the type of the sensor is based on the number of the at least one wired connection, wherein the step of identification comprises providing an excitation current via a transmitter, to the sensor and measuring a voltage across the sensor: and
 identifying, by the processing device, a configuration among a plurality of configurations based on the type of the sensor, wherein the configuration includes an upper range value and a lower range value for an operating temperature of the sensor.

6. The method of claim 5, wherein the configuration includes a sub-type for the type of the sensor, the method further comprising:
 identifying one or more of a resistance or temperature of the sensor; and
 determining a sub-type for the type of sensor based on at least one of the 30 resistance or temperature of the sensor.

7. The method of claim 5, further comprising:
 providing an option for a selection of self-configuration or manual configuration; and
 receiving the selection for either self-configuration or manual configuration.

8. The method of claim 5, further comprising: directing the excitation current based on a status of a switch.

9. A non-transitory computer readable medium containing computer readable program code that, when executed, causes at least one processing device to:
 identify at least one wired connection to a sensor;
 detect a type of the sensor based on the at least one wired connection;
 the step of detecting comprising identifying a number of the at least one wired connection, the type of the sensor is based on the number of the at least one wired connection, wherein the step of identification comprises providing an excitation current via a transmitter, to the sensor and measuring a voltage across the sensor: and
 measuring a voltage across the sensor: and identify a configuration among a plurality of configurations based on the type of the sensor, wherein the configuration includes an upper range value and a lower range value for an operating temperature of the sensor.

10. The non-transitory computer readable medium of claim 9, wherein the configuration includes a sub-type for the type of the sensor, further comprising computer readable program code to:
 identify one or more of a resistance or temperature of the sensor; and
 determine a sub-type for the type of sensor based on at least one of the resistance or temperature of the sensor.

11. The non-transitory computer readable medium of claim 9, further comprising computer readable program code to: provide an option for a selection of self-configuration or manual configuration; and receive the selection for either self-configuration or manual configuration.

* * * * *